July 14, 1964     R. BERG     3,140,758
CART
Filed Aug. 24, 1960     4 Sheets-Sheet 1
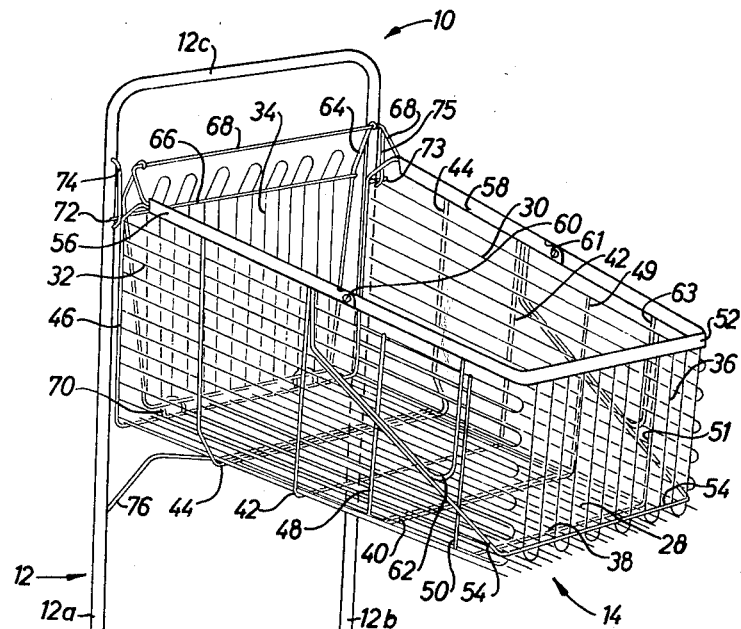
FIG.1
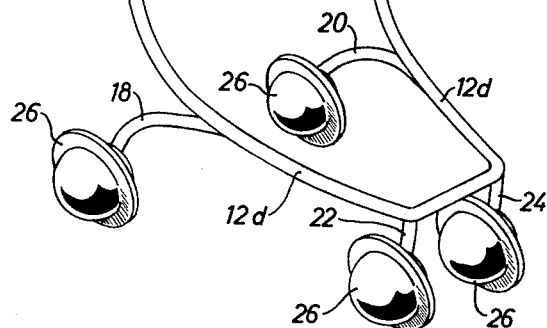
INVENTOR.
RAGNAR BERG
BY
ATTORNEYS July 14, 1964 R. BERG 3,140,758
CART
Filed Aug. 24, 1960 4 Sheets-Sheet 2

INVENTOR.
RAGNAR BERG
BY
Mason, Kolehmainen, Rathburn and Wyss
ATTORNEYS

July 14, 1964 R. BERG 3,140,758
CART
Filed Aug. 24, 1960 4 Sheets-Sheet 3

INVENTOR.
RAGNAR BERG
BY
Mason, Kolehmainen, Rathburn and Wyss
ATTORNEYS.

INVENTOR.
RAGNAR BERG

United States Patent Office 3,140,758
Patented July 14, 1964

3,140,758
CART
Ragnar Berg, Hagersten, Sweden, assignor to Svenska
Dataregister Ab, Stockholm, Sweden, a corporation of
Sweden
Filed Aug. 24, 1960, Ser. No. 51,578
Claims priority, application Sweden Aug. 26, 1959
19 Claims. (Cl. 186—1)

This invention relates to a cart for use in self-service stores and, more particularly, to a cart of this type including means for automatically discharging its contents when it reaches the check-out counter of the store.

In grocery supermarkets and other self-service retail establishments, it has become a common practice to provide wheeled vehicles having baskets or containers thereon for use by customers in collecting and transporting items of merchandise to a check-out counter or cashier's position. The collected articles are then manually removed from the basket and placed on the counter adjacent the cashier, a practice which is both laborious and inconvenient for the customer particularly when heavy items have been collected. The time required to remove the articles to be purchased from the basket or container often delays the cashier and results in an undesirable interruption in the movement of customers through the check-out position.

Accordingly, one object of the present invention is to provide a new and improved wheeled vehicle for transporting articles.

Another object is to provide a self-service cart including a container and means for discharging articles from the container.

Another object is to provide a self-service cart including a container or basket having a movable wall structure thereon through which articles can be discharged.

Another object is to provide a self-service cart including a movably mounted container or basket which may be automatically tilted in order to discharge its contents.

In accordance with these and many other objects an embodiment of the invention comprises a supporting chassis or frame having at its bottom a plurality of floor engaging wheels. An upper portion of the chassis or frame pivotally supports an open wire basket or container having a pivotally mounted rear wall structure which permits the baskets on a plurality of self-service carts to be nested when these carts are stored between periods of use. The remainder of the basket construction is defined by a pair of side walls, a front wall and a bottom wall.

The rear portions of the side walls of the basket construction, which is formed of lengths or loops of wire, are rigidly secured to the bottom wall structure by a plurality of spaced supporting elements. The portions of the loops or lengths of wire forming the forward portion of the basket are stressed so that the forward portions of the side walls tend to flare outwardly. To provide a means for normally retaining the forward portions of the side walls of the basket in a position substantially parallel with the rear portion of the basket, the upper edge of the basket is provided with a rigid supporting frame including two members secured to the upper edge of the rear portion of the side walls and a substantially U-shaped intermediate portion or frame element that is pivotally connected to the two members. The legs of the U-shaped frame element include depending retaining members for holding the forward portions of the side wall structures in position. A front wall structure carried by the bight portion of the U-shaped frame element closes the front end of the basket construction when the U-shaped frame element is pivoted downwardly relative to the basket. When the U-shaped frame element is pivoted upwardly the front wall structure is displaced to provide a front opening for the discharge of articles from the basket while, at the same time, the retaining members are released to permit the forward portions of the side wall structures to deflect outwardly, thus increasing the size of the front opening to facilitate the egress of the articles.

To provide a means for engaging the cart for the purpose of automatically discharging the articles contained therein, the counter structure includes a counter top or slide inclining upwardly near one end. When the cart is pushed forward to move the basket over the counter top, the uppermost portion of the inclined counter top or slide engages the lower wall structure of the basket in order to tip or pivot the basket relative to the cart frame so that the outer or forward end of the basket is inclined downwardly into engagment with the corresponding inclined surface of the counter construction. When the U-shaped frame member on the basket construction is moved upwardly to remove the front wall and, hence, to uncover the front opening in the basket, the articles contained in the basket are discharged onto the counter surface either by the force of gravity causing them to slide along the basket bottom and onto the counter or by the application of a very slight external force to push the articles from the basket onto the counter. In this manner, the contents of the cart are discharged onto the counter construction adjacent the cashier's position without requiring them to be manually lifted from the basket to be deposited one at a time on the counter, thus conserving the time of both the cashier and the customer, and at the same time, making the discharge operation much more convenient for the customer.

Many other objects and advantages of the present invention will become apparent from considering the following detailed description in conjunction with the accompanying drawings in which:

FIG. 1 is a perspective view of a self-service cart embodying the present invention;

Figure 3:
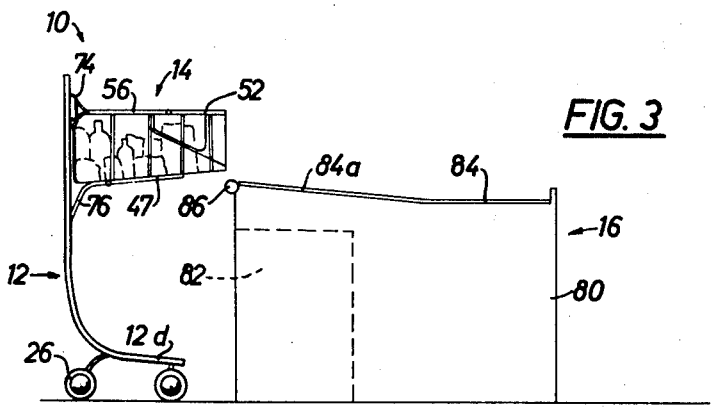
FIG. 3 is a schematic elevational view illustrating a loaded self-service cart approaching a counter construction.
Figure 4:
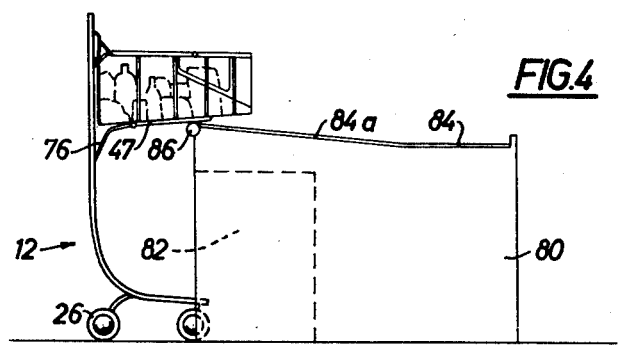
FIG. 4 is an elevational view similar to FIG. 3 but illustrates the cart in advanced position with its basket partially overlying the counter construction.
Figure 5:
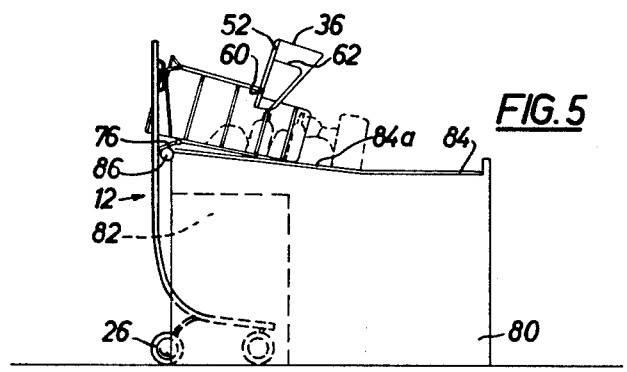
FIG. 5 is an elevational view similar to FIGS. 3 and 4 but illustrates the cart in a fully advanced position where its basket has been tilted to discharge articles onto the counter construction.

Referring now more specifically to FIGS. 1 and 3-5 of the drawings, there illustrated is a self-service cart, indicated generally as 10, which embodies the present invention and which includes a supporting frame 12 on which a basket construction, indicated generally as 14, is movably mounted. To provide a means for automatically discharging articles from the cart 10 there is provided a counter construction, indicated generally as 16 (FIG. 3), which engages the cart when the latter is advanced and coacts with the cart structure to tilt or pivot the basket construction 14 so that the articles may pass through a removable front wall 36 of the basket construction 14 when the latter wall is moved to a displaced position. The basket construction 14 pivots to a position where it is tipped downwardly to permit articles contained therein to be moved freely onto the counter construction 16 (FIG. 5). Thus, the time required to remove the contents of the cart 10 is materially reduced with an attendant increase in the speed at which each customer may pass through a check-out position.

Referring now more specifically to the construction of the cart 10 (FIG. 1), the chassis or supporting frame 12 preferably comprises a generally vertically extending portion formed by a tubular structure including two side rails 12a and 12b joined by an upper bight or handle portion 12c. The frame further includes a forwardly extending lower portion formed by a somewhat U-shaped, curved portion 12d formed integrally with the vertically extending portion. Four arms 18, 20, 22 and 24 secured to the lower frame portion 12d respectively support four floor engaging casters or wheels 26.

The basket construction 14 (FIGS. 1 and 2) includes a bottom wall structure 28, a pair of side wall structures 30 and 32, pivotally mounted rear wall structure 34, and a movably mounted front wall structure 36. The bottom wall structure 28 is formed by a plurality of lengths of wire secured as by welding, to a pair of transverse, generally horizontal supporting elements 38 and 40 and to the bight portion of three U-shaped supporting elements 42, 44 and 46. A pair of members 47 respectively extend along the opposed sides of the bottom wall structure 28 to provide means for engaging the counter construction 16. Each of the side walls 30 and 32 is formed of several loops or U-shaped lengths of wire, with the wires forming the side wall 32 being secured to a pair of generally vertical supporting elements 48 and 50 at the forward end of the basket construction 14 and to a first of the leg portions of the U-shaped supporting elements 42, 44 and 46 at the rear portion of this basket construction. The wires forming the side wall 30 are secured to a pair of generally vertical supporting elements 49 and 51 extending parallel to the elements 48 and 50, respectively, near the forward end of the basket construction and to the other leg portions of the U-shaped supporting elements 42, 44 and 46. The bight portion of the U-shaped loops or lengths of wire forming the side walls 30 and 32 are positioned adjacent the forward end of the basket 14 and are prestressed to permit the forward portions of the side wall structures 30 and 32 to flare outwardly when the front wall structure 36 is moved to its displaced position shown in FIGS. 2 and 5.

The front wall structure 36 is provided by a plurality of loops of wire secured between the bight portion of a relatively thick U-shaped frame member 52 and the bight portion of a U-shaped frame element 54. The two legs of the frame member 52 are pivotally connected to one end of a pair of frame elements 56 and 58, respectively, by a pair of pivot pins 60 and 61 spaced inwardly from the end of the legs of the member 52. The legs of the U-shaped frame member 52 protrude slightly rearwardly beyond the pivot pins and are secured at their free ends to the upwardly bent ends of the frame element 54. A pair of somewhat U-shaped intermediate supporting elements 62 and 63 each has its two ends or legs secured to one of the legs of the U-shaped frame member 52 to provide means for normally retaining the forward or free portions of the side wall structures 30 and 32 in a normal position aligned with the rear portions of the wall structures. More specifically, as is shown in FIG. 1 of the drawings, when the front wall structure 36 is in position to close the forward end of the basket, the elements 54 and 62 engage the elements 48 and 50 on the side wall structure 32 while the elements 54 and 63 engage the elements 49 and 51 on the side wall structure 30 to prevent the forward portions of these wall structures from diverging or flaring outwardly. However, when the front wall structure 36 is pivoted about the pins 60 and 61 to displace it to the position shown in FIG. 2, the elements 54 and 62 are moved out of engagement with the elements 48 and 50 and the elements 54 and 63 disengage the elements 49 and 51 with the result that the loops forming the forward portions of the side wall structures 30 and 32 are permitted to deflect outwardly away from the bottom wall of the basket.

The rear wall structure 34 comprises a plurality of loops of wire secured at one end to the bight portion of a generally vertical, U-shaped element 64 and at the other end to a horizontal support element 66 which is secured between the legs of the U-shaped element 64 near but spaced below its upper ends. To provide a means for pivotally mounting the rear wall structure 34 on the basket construction 14 a U-shaped element 68 is provided having the ends of its legs respectively secured to the frame members 56 and 58. The upper ends of the U-shaped element 64 are formed with loops embracing the bight portion of the U-shaped element 68 in order to provide the pivotal mounting for the rear wall structure. A pair of loops 70 secured to and extending upwardly from the bottom wall structure 28 or the bight portion of the U-shaped element 46 provide stops for engaging the bight portion of the U-shaped element 64 in order to limit clockwise rotation of the rear wall structure 34 about the bight portion of the U-shaped element 68 as viewed in FIGS. 1 and 2.

Figure 6:
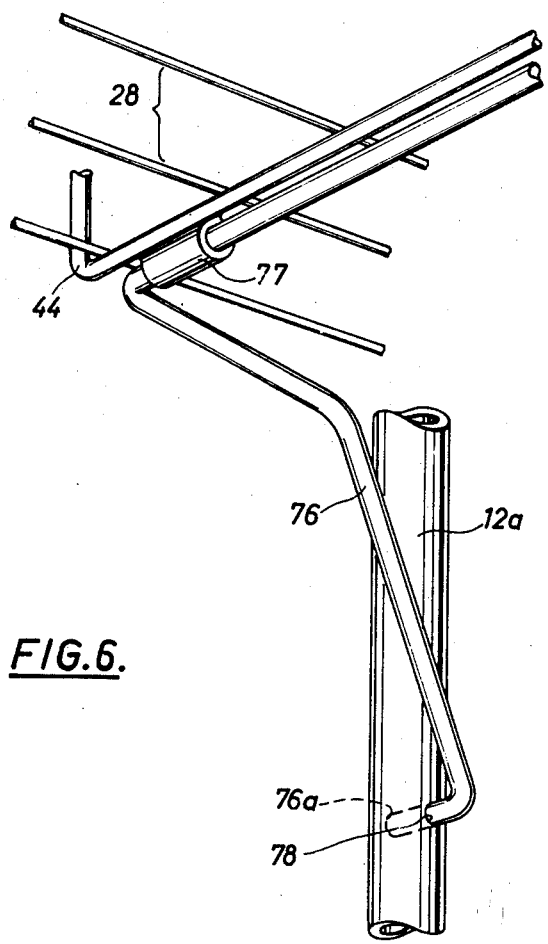
FIG. 6 is an enlarged perspective view of a hinged supporting means for the basket construction shown in FIGS. 1 and 2.

To provide means for movably or pivotally mounting the basket construction 14 on the frame 12 of the cart 10, a pair of pins or stub shafts 72 and 73 are respectively secured near the upper ends of the two legs of the U-shaped element 46 and these two pins are positioned within two elongated guide openings, one of which is defined by the vertical side rail 12a and a retaining element 74 mounted thereon and the other of which is defined between the other side rail 12b and a second retaining element 75. To provide structure for rocking the basket upon the pins 72 and 73 when the cart engages the counter construction 16, a generally U-shaped element 76 (FIGS. 1, 2, and 6) is pivotally secured to the bottom wall structure 28 by two pintles or loops 77 (FIG. 6) and is provided with two offset legs each having an outwardly extending tip or finger 76a (FIGS. 2 and 6) that is pivotally received in an opening 78 in one of the side rails 12a and 12b. When the basket is in its normal, article collecting position shown in FIG. 1 the bight portion of the element 76 limits the clockwise rotation of the basket upon the pins 72 and 73 and holds the basket with its bottom wall inclined forwardly and upwardly to permit the front end of the basket to pass over the end of the counter construction 16.

As is shown in FIGS. 3, 4 and 5, the counter construction 16 includes a structure 80 which is mounted upon the floor and which includes a recess 82 for receiving the wheeled, forwardly extending, lower portion of the cart 10. The upper surface of the structure 80 provides a counter top 84 having a rearwardly and upwardly inclined end or slide portion 84a with a roller or other basket engaging structure 86 thereon for engaging the bottom wall structure 28 of the basket assembly 14 when the cart is advanced. At least a portion of the slide or inclined end portion 84a of the counter top 84 may comprise spaced wires between which the forward or free ends of the wires forming the bottom wall structure 28 are inserted to provide a surface free of abrupt discontinuities that might interfere with the movement of articles from the basket construction 14 onto the slide 84a. The counter construction 16 may also include provision for mounting a cash register and a continuously driven conveyor belt for transporting articles from the inclined portion 84a of the counter top 84 past the cash register position and then to a suitable station where the articles may be placed in receptacles such as paper bags.

When a cart 10 containing articles to be purchased is moved to the check-out counter construction 16 its lower wheeled portion enters the recess 82 while the basket construction 14 moves toward the basket engaging structure 86 which engages the pair of elements 47 mounted on the lower surface of the bottom wall construction 28 (FIG. 4). As the cart 10 continues to advance toward the position shown in FIG. 5, the force acting against the elements 47 on the bottom wall structure 28 moves the basket construction 14 upwardly so that the pins 72 and 73 ride upwardly in the openings defined by the loops 74 and 75 while, at the same time, causing the U-shaped element 76 to pivot in a counterclockwise direction as viewed in FIGS. 1 and 2. This produces upwardly directed movement of the upper rear portion of the basket construction 14 and upwardly and rearwardly directed movement of the lower end of the back portion of the basket construction 14 so that the basket is tipped to the position shown in FIG. 5 where its bottom wall structure 28 is inclined downwardly until the forward end of the basket engages the slide or inclined portion 84a of the counter top 84. When the U-shaped frame member 52 is pivoted in a counterclockwise direction about the pivot pins 60 and 61 from the position shown in FIG. 1 to the position shown in FIGS. 2 and 5, the forward portions of the side walls 30 and 32 are freed to flex or flare outwardly and the front wall structure 36 is moved away from the front end of the basket construction 14 to provide a front opening for egress of articles from the basket. These articles slide downwardly along the bottom of the basket and onto the counter top 84 due to the force of gravity. If necessary, any articles remaining in the basket construction 14 are discharged by pushing them onto the counter but this may be accomplished very easily and without lifting the articles.

Figure 2:
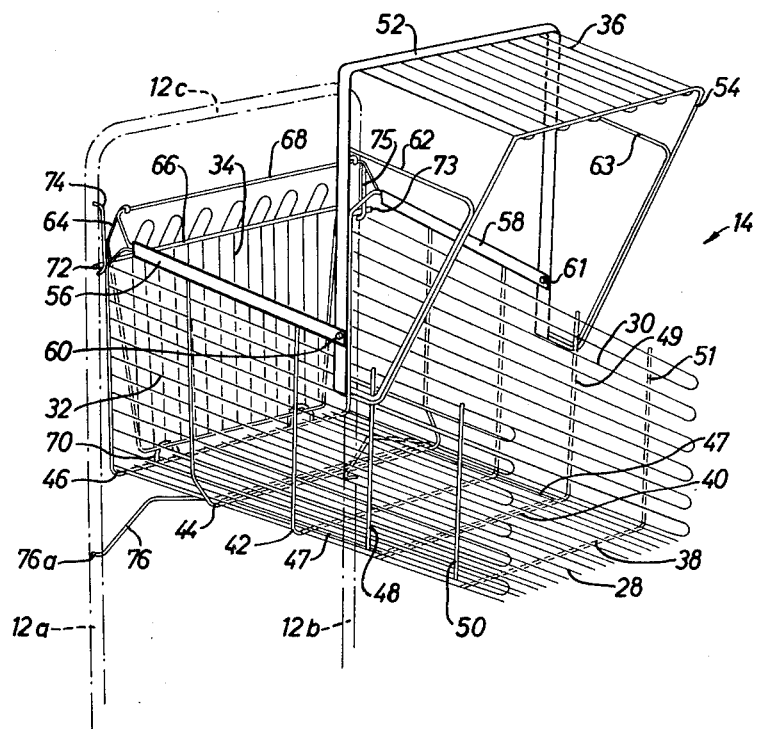
FIG. 2 is a fragmentary perspective view illustrating a basket construction included in the cart shown in FIG. 1 and showing the basket construction with its front wall displaced to form the front discharge opening.

When the articles have been discharged onto the top of the counter construction 16, the U-shaped frame member 52 may be returned to its closed position by pivoting it in a clockwise direction as viewed in FIG. 2 about the pivot pins 60 and 61. During this movement, the bight portions of the elements 62 and 63 and the legs of the U-shaped element 54 slide over the pair of elements 48 and 50 and over the similar pair of elements 49 and 51 to restore the forward portions of the side wall structures 30 and 32 to positions aligned with the back or rear portions thereof. In addition, the front wall structure 36 is moved to its normal or retaining position (FIG. 1) closing the article discharge opening at the front end of the basket construction 14. When the cart 10 is withdrawn or moved to the left from the position shown in FIG. 5 to the position shown in FIG. 4, the coaction between the elements 47 on the bottom wall structure 28 and the basket engaging structure 86 on the counter elevates the forward end of the basket construction 14 to move the pins 72 and 73 downwardly within the openings defined by the loops 74 and 75, which downward movement is terminated by engagement of these pins 72 and 73 with the bottom portions of the loops 74 and 75, respectively. Further, this movement of the basket construction 14 also pivots the U-shaped element 76 in a clockwise direction (FIG. 4) so that the lower rear portion of the basket construction 14 moves downwardly and to the right to the normal or article collecting position shown in FIGS. 1 and 3. Thus, the cart 10 is automatically restored to its normal position wherein it is ready for use. The pivoted rear wall structure 34 and the construction of the lower, wheeled portion of the cart permit several carts to be nested together for conservation of space during storage when the carts are not in actual use. Thus, the rear wall structure pivots inwardly or in a counterclockwise direction as viewed in FIG. 1 to permit the entry of the basket on another cart. At the same time, the rear wheels of the cart are spaced farther apart than the front wheels since the lower frame members or rails 12d converge forwardly of the vehicle, thus permitting the lower, forwardly extending portion of the next succeeding cart to pass beneath the basket with its forward wheels resting within the lower rails 12d.

Although the present invention has been described with reference to a single embodiment thereof, it should be understood that those skilled in the art may devise numerous other modifications and embodiments that fall within the spirit and scope of the principles of this invention.

What is claimed and desired to be secured by Letters Patent of the United States is:

1. An article collecting cart for use with a counter construction having an engaging means, a wheeled frame, a basket having a forwardly and upwardly inclined bottom wall and supported at an elevated position upon said frame, and means pivotally mounting said basket on said wheeled frame with said inclined bottom wall disposed to permit said cart to be advanced to bring said inclined bottom wall over the engaging means, the basket mounting means including structure engaged by said engaging means when the cart is advanced for pivoting said basket upon said frame to a position where said bottom wall is downwardly and forwardly inclined.

2. A self-service cart for use with a fixed counter structure, said cart comprising a wheeled frame, a basket construction mounted at an elevated position on said frame, means pivotally mounting said basket construction on said frame, and basket tilting means including forwardly and upwardly inclined structure on said basket construction for engaging said counter structure when said cart is advanced to a position where said basket construction moves over said counter structure, said inclined structure being engaged by said counter structure to cause the basket tilting means to pivot said basket construction relative to said frame.

3. A self-service cart for use with a fixed counter structure, said cart comprising a wheeled frame, a basket having a floor portion and also having one end mounted at an elevated position on said frame, means mounting an upper portion of said one end of said basket for pivotal and upward movement on said frame, and basket tilting means including forwardly and upwardly inclined structure on said basket for engaging said counter structure when said cart is advanced to move said basket over said counter structure, said inclined structure being engaged by said counter structure to raise said upper portion of said basket and to pivot said basket relative to said frame until said floor portion is inclined forwardly and downwardly.

4. An article collecting wheeled vehicle comprising an upwardly extending frame having a generally horizontally extending portion, wheels carried on said frame beneath said horizontally extending portion, a basket and mounting means for movably supporting one end of said basket on said frame in a position wherein the basket extends outwardly over and has a free outer end spaced above said horizontally extending portion, said mounting means including first means connecting an upper portion of said basket near said one end for pivotal and vertically upward movement relative to said frame, said mounting means further including structure supporting a lower portion of said basket near said one end for pivotal and rearward movement relative to said frame.

5. An article collecting wheeled vehicle comprising an upwardly extending frame having a generally horizontally extending portion, wheels carried on said frame beneath said horizontally extending portion, a basket and mounting means for movably supporting one end of said basket on said frame in a position wherein the basket extends outwardly over and has a free outer end spaced above said horizontally extending portion, said mounting means including first means connecting a portion of said basket construction near said one end for pivotal movement relative to said frame from a generally horizontal normal position to a discharging position inclined downwardly toward said wheels, said basket including structure normally closing its free end but mounted for pivotal movement upon said basket to open said free end to facilitate the removal of articles from said basket.

6. An article collecting cart for use with a counter construction having an engaging means, a wheeled frame, a basket having a bottom wall and supported at an elevated position upon said frame, and means mounting an upper portion of one end of said basket for pivotal and vertically upward movement relative to said wheeled frame, structure mounting a lower portion of said basket near said one end for pivotal and rearward movement relative to said frame, said mounting means being normally effective to maintain said bottom wall in forwardly and upwardly inclined position to permit said cart to be advanced to bring said inclined wall into engagement with the engaging means, said engaging means coacting with said inclined wall to lift said upper portion of said basket, to move said lower portion of said basket rearwardly and to pivot said basket upon said frame until said bottom wall is inclined forwardly and downwardly.

7. In a self-service cart, a basket assembly including a bottom wall and a pair of side walls, means rigidly securing a first portion only of each side wall to said bottom wall, said side walls having second portions free to move to positions wherein said second portions diverge, and a retaining structure movable between a first position engaging said second portions of said side walls for preventing movement thereof and a second position out of engagement with said second portions in order to free said second portions for movement.

8. The cart set forth in claim 7 including an end wall structure carried on said retaining structure, said end wall structure extending between said second portions of said side walls when said retaining structure is in said first position to close one end of said basket construction and being spaced from said second portions of said side walls to open the end of said basket construction when said retaining structure is moved to said second position.

9. In a self-service cart, a basket assembly including a bottom wall and a pair of side walls, means rigidly securing a first portion only of each side wall to said bottom wall adjacent one end of the basket, said side walls having second portions adjacent the opposite end of the basket formed of wire prestressed to exert a force on each said second portion tending to move said second portions to positions wherein they diverge outwardly at said opposite end of the basket, and a retaining structure movable between a first position engaging said second portions of said side walls for preventing outward movement thereof and a second position out of engagement with said second portions to free said second portions for outward movement.

10. The cart set forth in claim 9 including an end wall structure carried on said retaining structure, said end wall structure extending between said second portions of said side walls when said retaining structure is in said first position to close one end of said basket construction and being spaced from said second portions of said side walls to open the end of said basket construction when said retaining structure is moved to said second position.

11. In a basket for use in self-service carts, a plurality of lengths of wire, a plurality of generally U-shaped supporting elements to which said lengths of wire are secured to form a generally U-shaped basket having a bottom wall and a pair of spaced side walls, said U-shaped supporting elements being spaced from each other and secured to said lengths of wire adjacent one end of said basket to rigidly connect said side and bottom walls of said basket, a plurality of generally vertical supporting elements secured to the lengths of wire forming the individual side walls adjacent the end of the basket opposite to said one end, and at least one generally horizontally extending supporting element separate from said vertical supporting elements and secured to the wire forming the bottom wall of said basket, at least some of the lengths of wires forming the side walls being prestressed adjacent said opposite end of said basket to exert a force tending to separate the side and bottom walls at said opposite end of said basket.

12. The basket construction set forth in claim 11 including a retaining means movably mounted on said basket for engaging said side walls adjacent said opposite end of said basket and movable between a first position wherein it engages said side walls to prevent them from separating and a second position wherein it disengages said side walls to permit said side and bottom walls to separate.

13. The basket construction set forth in claim 11 in which the lengths of wire forming said pair of side walls include at least some lengths of a U-shaped configuration having the bight portion disposed at said opposite end of said basket.

14. The basket construction set forth in claim 11 in which the lengths of wire forming said bottom wall are substantially straight at said opposite end of said basket and include end portions projecting beyond the horizontal supporting element disposed closest to said opposite end of said basket.

15. In a basket for use in self-service carts, a plurality of lengths of wire, a plurality of rigid supporting elements to which said lengths of wire are secured to form a generally U-shaped basket having a bottom wall and a pair of spaced side walls, said supporting elements being spaced from each other and secured to said lengths of wire adjacent one end of said basket to rigidly connect said side and bottom walls of said basket, side wall supporting means secured to the lengths of wire forming the individual side walls at positions adjacent the end of the basket opposite to said one end, and bottom wall supporting means separate from said side wall supporting means and secured to the wire forming the bottom wall of said basket adjacent said opposite end, the portions of said side and bottom walls adjacent said opposite end of said basket being separable to form an outwardly flared discharge opening for articles within the basket.

16. The basket construction set forth in claim 15 including a retaining means movably mounted on said basket for engaging said side walls adjacent said opposite end of said basket and movable between a first position wherein it engages said side walls to prevent their separation and a second position wherein it disengages said side walls and permits said side and bottom walls to separate.

17. The basket construction set forth in claim 15 in which the lengths of wire forming said pair of side walls include at least some lengths of a U-shaped configuration having the bight portion disposed at said opposite end of said basket.

18. The basket construction set forth in claim 15 in which the lengths of wire forming said bottom wall are substantially straight at said opposite end of said basket and include end portions projecting beyond the horizontal supporting element disposed closest to said opposite end of said basket.

19. An article collecting wheeled vehicle comprising an upwardly extending frame having a generally horizontally extending portion, wheels carried on said horizontally extending portion, a basket construction including a bottom wall and a pair of side walls, a first portion of both of said side walls at one end of said construction being rigidly connected to the basket construction and a second portion of both of said side walls at the other end of said construction being movable to divergent positions to provide a discharging opening from said basket construction, retaining means normally holding said second portions against movement to said divergent positions, and mounting means for movably supporting said one end of said basket construction on said frame in a position wherein the basket construction extends outwardly over and has said other end spaced above said horizontally extending portion, said mounting means including first means connecting a portion of said basket construction near said one end for pivotal movement relative to said frame so that said other end of the basket construction can be pivoted downwardly to facilitate the discharge of goods from said basket construction when said retaining means releases said second portions of the side walls for movement to said divergent positions.

References Cited in the file of this patent

UNITED STATES PATENTS

| | | |
|---|---|---|
| 409,083 | Welch | Aug. 13, 1889 |
| 1,722,416 | Glenny | July 30, 1929 |
| 1,902,093 | Oglive | Mar. 21, 1933 |
| 2,286,548 | Jackson et al. | June 16, 1942 |
| 2,583,514 | Maslow | Jan. 22, 1952 |
| 2,590,285 | Wiltshire | Mar. 25, 1952 |
| 2,644,695 | Enders | July 7, 1953 |
| 2,646,186 | Russell | July 21, 1953 |
| 2,672,218 | Genung | Mar. 16, 1954 |
| 2,871,024 | Young | Jan. 27, 1959 |
| 2,943,707 | Ramlose | July 5, 1960 |